June 19, 1923.

J. VON SERKEY

SPIRIT LEVEL

Filed Feb. 24, 1921

INVENTOR

Joseph Von Serkey

Patented June 19, 1923.

1,459,381

UNITED STATES PATENT OFFICE.

JOSEPH VON SERKEY, OF SAN FRANCISCO, CALIFORNIA.

SPIRIT LEVEL.

Application filed February 24, 1921. Serial No. 447,509.

*To all whom it may concern:*

Be it known that I, JOSEPH VON SERKEY, a citizen of the United States, residing at San Francisco, in the county of San Francisco, State of California, have invented new and useful Improvements in Spirit Levels, the preferred form illustrated, described, and claimed as follows.

My invention relates to improvements in spirit levels whereby the relative relation of a unit length of base line or surface to the true line of levels is directly ascertained by any desired measures standard, then by the law of proportion readily computed for any multiple of the unit length at which the instrument is set for the initial measurement of the relative error of a unit length of a line or surface.

The object of my invention is to provide a spirit level by which the "out of true" error is directly ascertained and gauged by the desired measurement standard for which the instrument is constructed.

With the above object in view, the invention consists in the novel construction and combination of parts hereinafter described and illustrated in the accompanying drawing, and set forth in the claim hereto appended, it being understood that various changes of form, proportion, size and minor details of construction within the scope of the claim may be resorted to without departing from the spirit or sacrificing any of the advantages of the invention.

To more fully comprehend the invention reference is directed to the accompanying drawing, wherein.

Figure 1:
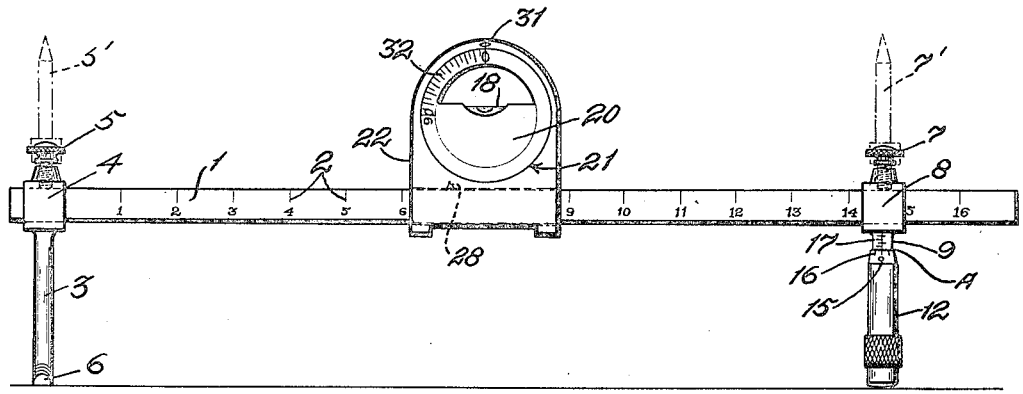
Fig. 1, is a front elevational view.
Figure 3:
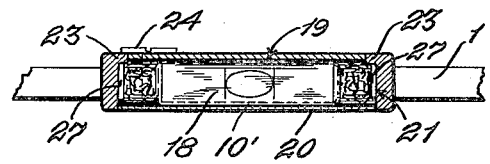
Fig. 3, is a section on line 3—3 of Fig. 2.
Figure 2:
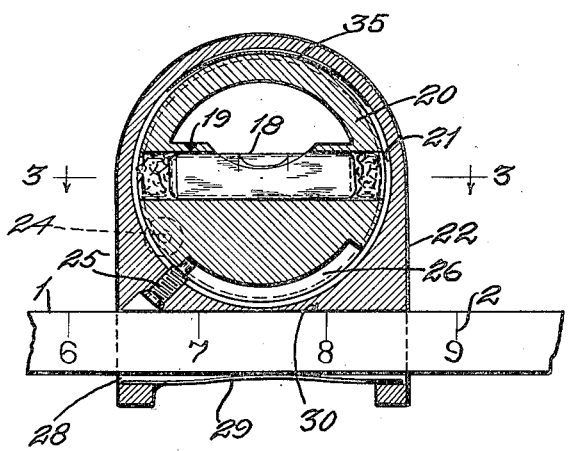
Fig. 2, is an enlarged longitudinal section of the "spirit" tube frame and support.
Figure 4:
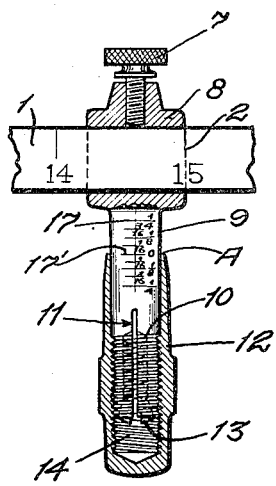
Fig. 4, is an enlarged partially sectional view of the micrometer adjustment support of the instrument.

Referring more particularly to the several views of the drawing wherein like characters of reference designate corresponding parts the numeral 1 indicates a bar of any desired material, preferably metal, of any desired cross sectional form, preferably rectangular, and of the desired length, having marked thereon a scale 2 of the desired measurement values. Slidably mounted at one extremity of the bar 1 and removable therefrom for convenience in packing and to allow the use of various length bars, is the support 3 extending at right angles to the axis of the bar 1 and provided at one extremity with the bearing 4 slidably fitted on the bar 1 and secured thereto at the desired position, (preferably the zero mark of the chosen scale) by means of the thumb screw 5. The opposite extremity of the support 3 is provided with lateral extensions or foot 6, relatively transverse to the bar 1 for the purpose of lateral plumbing of the instrument upon the work. Slidably mounted upon the bar 1 and clamped thereon at any required point relative to the support 3 by means of a thumb nut 7, is the bearing 8, and integral therewith and extending at relatively right angles to the bar 1 and in the plane of the support 3 and the bar 1 is the cylindrical extension or spindle member 9, the lower extremity thereof having a male-thread portion 10 of the desired pitch relative to the "scale" standard used. The threaded extremity of the spindle 9 is bifurcated by the slot 11 to allow of slight expansion to prevent lost motion of the threaded portion 10 within the thimble 12 by tightening the conical head set-screw 13 threaded within the extremity of the spindle 9. Mounted upon the spindle member 9, by means of the receiving thread 14, and free to rotate thereon is the sleeve or thimble 12 the open extremity thereof surrounding the spindle 9 having marked thereon a zero mark 15 and having the circumference thereof divided into the desired fractional parts scale 16 equaling one complete turn or unit of measurement determined by the thread pitch, with consequent reading in fractional parts by the scale 16 relative to the corresponding rotational movement of the thimble 12. A whole number or unit measurement equaling one complete turn of the thimble 12 with corresponding longitudinal movement equaling the thread pitch, being designated by the units of the scale 17 marked upon the spindle member 9.

The zero marks upon the micrometer ensemble A, position the base line of the instrument coincident with the true line of levels, as indicated by the "spirit" tube 18 mounted in the bore 10' of the circular frame 20 this frame and integral spirit tube 18 being rotatably mounted in the circular bore 21 of the frame 22 and secured laterally therein by means of the shoulder 23 and screw 24. The desired angular relation (relative to the applied use of the instrument, of the "spirit" tube 18 and circular frame 20 being maintained in the two stop positions: namely parallel and at right angles to the base line of the instrument when set at zero) is maintained by the stop screw 25 in the frame 22 entering the ninety degree arcuate groove 26 in the circular frame 20, and volitionally set and maintained at any intermediate angle by the spring 35 compressed within the annular space 27 between the circular frame 20, and frame 22. To facilitate the use of various length bars 1, for removal in packing, and for adjustment relative to the desired proportional relation setting of the micrometer ensemble A, and the support 3, and to maintain this setting while in use, the frame 22 is provided with a bore 28 through which passes the bar 1, upon which the frame 22 is free to slide by manual movement, yet be maintained in the desired position by means of the compressed flat spring 29, (secured in any suitable manner) forming one side of the bore 28 thus maintaining the opposite side 30 of the bore 28 in the frame 22, in frictional contact with the bar 1.

For setting the circular frame 20, and "spirit" tube 18, at the desired relative angle, other than parallel and at ninety degrees to the base line of the instrument, a zero mark 31 is placed upon the frame 22, with the surface of the circular frame 20 adjacent thereto, marked with a degree scale 32 from zero to ninety degrees relative to the ninety degree stop position of circular frame 20.

If it is desired to use the instrument as a pair of compasses, suitable points 5' and 7' may be inserted in place of the thumb nuts 5 and 7.

Used as a level the zero mark of the degree scale 32 on the circular frame 20, is made to coincide with the zero mark 31 of the frame 22. The zero mark 15 of the scale 16 on the thimble 12 rotated to coincide with the zero mark 17' of the scale 17, the "spirit" tube indicating "level," the base line of the instrument then coincides with the true line of levels, any deviation from this line by the surface upon which the instrument is placed is measured by rotating the thimble 12 above or below the zero mark 17' until the "spirit" tube indicates "level" and directly reading the unit difference upon the scale 17, and the fractional parts thereof on the scale 16, briefly a micrometer computation of the "out of level" error.

Used as a "plumb" the circular frame 20, is rotated to the ninety degree stop and the instrument adjusted by the micrometer ensemble A and read as above described.

For use on intermediate angles between the horizontal and vertical positions the circular frame 20 is rotated and the required angle made to coincide with the zero mark 31 of the frame 22 the micrometer ensemble A then adjusted, designates the "out of true" error of a line or surface in units and fractions thereof.

For use upon surfaces of large extent the setting of the micrometer ensemble A, to a proportional fractional length on the scale 2 of the bar 1, reduces to the simple process of multiplication the error computation of any multiple of the unit length.

Having thus described my invention I claim:

In a spirit level, the combination of a graduated bar, two supports slidable thereon in parallel relation to each other, one of the supports having a spindle threaded at its lower end, an internally threaded sleeve operatively engaging the spindle whereby the latter may be raised and lowered, and indicating means on the spindle and sleeve for indicating the rise or fall of the spindle relative to a zero point in full and fractional revolutions, and level finding means comprising a frame slidably mounted on the graduated bar, and having a circular aperture, a circular frame mounted in the aperture with freedom of limited rotary motion, and having a spring associated therewith for offering frictional resistance to the rotary motion, a spirit tube attached within the circular frame, and indicating means on the two frames disclosing the relative angle between the spirit level and the bar, all substantially as set forth.

In witness whereof, I hereunto set my hand.

JOSEPH VON SERKEY.